United States Patent [19]

Pavlovic et al.

[11] Patent Number: 5,715,379
[45] Date of Patent: Feb. 3, 1998

[54] ARCHITECTURE FOR A DIGITAL PRINTER WITH MULTIPLE INDEPENDENT DECOMPOSERS

[75] Inventors: Dragana Pavlovic; David Plakosh, both of Rochester; Michael A. Wiegand, Webster; Norman E. Wright, Rochester, all of N.Y.

[73] Assignee: Xerox Corporation, Stamford, Conn.

[21] Appl. No.: 550,320

[22] Filed: Oct. 30, 1995

[51] Int. Cl.[6] .................................................. G06K 15/00
[52] U.S. Cl. .......................... 395/112; 395/115; 395/116; 395/114
[58] Field of Search ...................... 395/112, 114, 395/101, 115, 116, 500, 502, 504, 505, 506, 507, 508, 512, 515, 516, 517, 518, 250, 509, 445, 453, 458, 495; 358/468, 407, 467, 444, 404, 460, 403, 261.4, 470; 347/142; 400/61, 62, 70, 76, 71

[56] References Cited

U.S. PATENT DOCUMENTS

| | | | |
|---|---|---|---|
| 4,992,958 | 2/1991 | Kageyama et al. | 395/116 |
| 5,075,874 | 12/1991 | Steeves et al. | 395/112 |
| 5,170,340 | 12/1992 | Prokop et al. | 364/148 |
| 5,226,112 | 7/1993 | Mensing et al. | 395/114 |
| 5,228,118 | 7/1993 | Sasaki | 395/112 |
| 5,276,780 | 1/1994 | Sugura | 395/116 |
| 5,293,466 | 3/1994 | Bringmann | 395/114 |
| 5,327,526 | 7/1994 | Nomura et al. | 395/115 |
| 5,333,246 | 7/1994 | Nagasaka | 395/502 |
| 5,371,837 | 12/1994 | Kimber et al. | 395/114 |
| 5,388,920 | 2/1995 | Ohara | 400/76 |
| 5,392,419 | 2/1995 | Walton | 395/500 |
| 5,402,527 | 3/1995 | Bigby et al. | 395/101 |
| 5,511,156 | 4/1996 | Nagasaka | 395/502 |

*Primary Examiner*—Edward L. Coles, Sr.
*Assistant Examiner*—Dov Popovici
*Attorney, Agent, or Firm*—Robert Hutter

[57] ABSTRACT

A digital printing system includes a plurality of decomposers which operate simultaneously and independently. Each decomposer outputs page images of decomposed data at essentially random times. The page images from the decomposers are retained in a buffer until requested by a marker which controls the printer hardware. A buffer manager records where in the buffer each page image is stored, and a stream handle is assigned to every set of page images intended to form a multi-page document. When the marker requests a particular set of page images for printing, the marker invokes a stream handle. The buffer manager, receiving the stream handle, retrieves the necessary page images from recorded locations in the buffer.

9 Claims, 3 Drawing Sheets

ARCHITECTURE FOR A DIGITAL PRINTER WITH MULTIPLE INDEPENDENT DECOMPOSERS

The present invention relates generally to decomposing, or interpreting, print jobs written in a plurality of page description languages for printing with a printing apparatus, and more particularly to a technique for facilitating the printing of jobs which combine images which are in heterogeneous page description languages or image formats.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser or ink-jet printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

With any PDL or image format, there will inevitably be a step of "decomposition" of the PDL or image format data into a form usable by an output device, such as a laser printer. Printing hardware requires a stream of binary data to be input into it. Thus, the instructions within the image format, such as to "print a white line," will eventually have to be translated into the actual binary code so that, for example, this code can be applied to the modulation of a laser source in a raster output scanner, or applied sequentially to individual ejectors in an ink-jet printer.

In the prior art, U.S. Pat. No. 5,075,874 discloses a printer having a plurality of physical ports which accept hardware cables. Each port is dedicated to a particular PDL emulation, although it is possible to temporarily reconfigure a particular port to accept a different PDL.

U.S. Pat. No. 5,170,340 discloses an electronic reprographic system having a plurality of hardware and software system components, which a control system construes as various virtual machines. There is included in the system a scheduler for managing resources and setting priorities for various virtual machines defined by the system to process job requests in an efficient manner. The scheduler causes memory from a first virtual machine in the system to be distributed to a second virtual machine in the system when the second virtual machine requests more memory than is normally allocated to it.

U.S. Pat. No. 5,226,112 discloses a system by which original data in different PDL's can be processed by the same processor. When the processor is requested to decompose data of a particular PDL, the processor retrieves suitable translation instructions for the particular PDL, in order to interpret the data. When a second set of image data, of a different PDL than the first image data, is submitted to the processor, the processor retrieves another interpretation code for interpreting the second set of data.

U.S. Pat. No. 5,228,118 discloses a printing system having at least one interpreter and a data processor connected to the printing device. The data processor sends to the printer an inquiry signal asking the printer to send back to the data processor interpreter identification data representative of the interpreter or interpreters. The data processor selects a printer driver compatible with the requested interpreter, on the basis of the interpreter identification data. The printer sends the interpreter identification data to the data processor in response to the inquiry signal.

U.S. Pat. No. 5,276,780 discloses a data filing system for filing documents in a data file memory. The data filing system includes means for registering each document size in the data file memory together with image data.

U.S. Pat. No. 5,293,466 discloses a printer which is capable of interpreting print jobs in various printer control languages. The printer samples a portion of each print job and analyzes the sampled portion of the print job statistically to identify the printer control language in which the print job is encoded.

U.S. Pat. No. 5,327,526 discloses a print job control system which processes print requests to set an order of priority for printing print jobs. A print job manager checks the print request and determines which print option is selected and manipulates the queue identifier associated with print jobs and enters them into a print queue table.

U.S. Pat. No. 5,371,837 discloses a virtual printer system in which a user on a network is allowed to select a printer default configuration from a plurality of preset default configurations to control a printer on the network. By this technique, print data for a plurality of printer configurations can be sent through a single printer network interface to a single printer.

The Xerox "DocuTech"® network printing system includes provision for combining multiple files together as a unique print job, even if the different files are of different PDL file types or TIFF image files. Separate files can be submitted to the network server, and then submitted by the network server to printer hardware as a single output document.

According to the present invention, there is provided an apparatus for processing files in a first image format and a second image format, each of the files in the first image format and the second image format comprising data corresponding to at least one page image. A first decomposer and a second decomposer are provided, operable simultaneously and independently, the first decomposer accepting files in the first image format and a second decomposer accepting files in a second image format. Each decomposer outputs data relating to a series of discrete page images, each page image corresponding to an individual page to be printed. A buffer retains discrete page images output by either of the first decomposer and second decomposer. A buffer manager directs each page image output by either of the first decomposer and second decomposer to an identifiable location in the buffer, and records the location of each page image in the buffer. A marker requests a set of page images desired to be printed to be read from the buffer to printing hardware.

In the drawings

Figure 1:
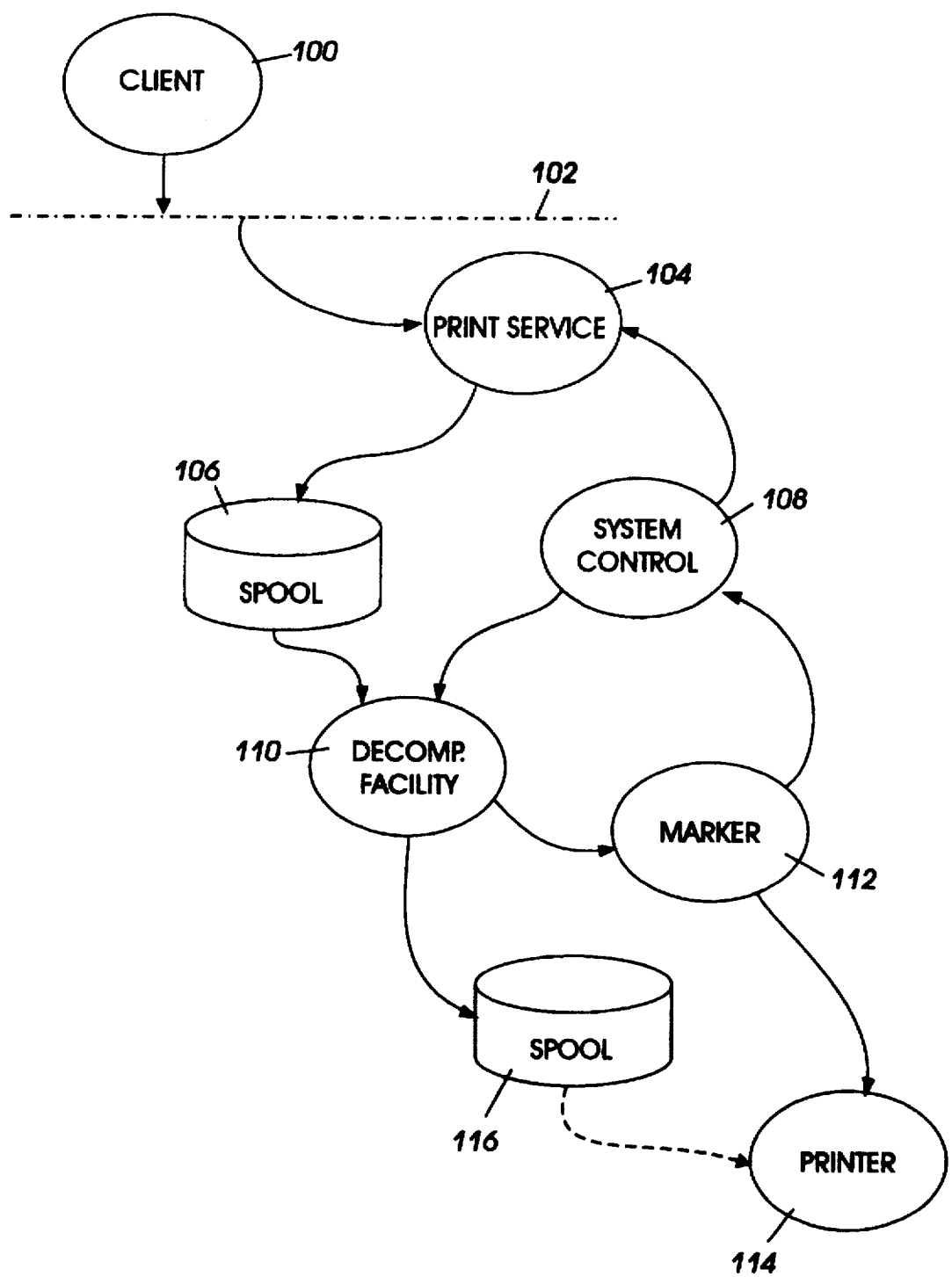
FIG. 1 is a diagram giving a general overview of an on-demand network printing system incorporating the present invention.

FIG. 1 is a diagram giving a general overview of an on-demand printing system incorporating the present invention. A client indicated as 100 will typically have a print job to be submitted to the printing system. This job is typically in the form of a file which is expressed in one of many different commercially-available formats. Typical of such formats are the page description languages or PDLs, such as PostScript or HP-PCL and their respective variants, as well as other formats such as TIFF or ASCII. It is also conceivable that a job to be printed could exist in compressed or uncompressed binary form, such as when the printing system is used as a copier and the data is fed directly from a digital scanner. As used in the present description and claims, a "file" will refer to any set of image data submitted for printing, regardless of whether it is in the form of a commercially-available PDL such as PCL or PostScript, or in another format such as TIFF or ASCII. ("PostScript" is a trademark of Adobe, Inc.) Typically, for large-scale on-demand printing systems, the client 100 is one of several clients which each access a network bus 102 which enables the client 100 to contact the printing system as desired. Indeed, several printing systems may exist on a network, and an individual client having a job to be printed will select a printing system capable of handling his particular job.

A printing system on network bus 102 includes a print service 104 which receives the submitted job from client 100 through network 102. The "job" is in the form of at least two portions: the PDL itself, that is the data desired to be printed, which is typically in the form of a PDL or other format, and a "job description" on which the client 100 has specified certain instructions for printing the job. This job description could include, for example, a specification of how many copies of the print are to be made, on what size and color of paper the prints are to be made, into what tray the prints are to be inserted, whether the prints are to be duplexed, collated, stapled, or otherwise finished, etc. The data comprising the job description can include instructions in a "job ticket" separable from the portion of the file which defines the image data, and also can include instructions which are embedded within a PDL file.

The print service 104, having received the file and the associated job description, directs the PDL to a spool 106 and at least some of the job description data to a system control 108. The file retained temporarily on spool 106 remains in the form in which it was submitted, such as in PostScript, HP-PCL, or in another form such as TIFF or ASCII. The file is retained in spool 106 until it is, in the case of data in a PDL, decomposed into a form usable by printing hardware. This decomposition, or other interpretation, is performed by what is here referred to as a "decomposition facility" 110, which may include several independently-operable decomposers, each dedicated to a different PDL, in a manner which will be described in detail below.

System control 108 interprets the desired specifications from the job description to control the decomposition facility 110 and also what is here defined as a "marker" 112. Marker 112 controls the printing hardware so that the image embodied in the PDL is caused to print out by the printer hardware 114 according to the instructions in the job ticket. System control 108 also controls the decomposition facility 110 to remove the PDL from spool 106, decompose the data according to the required decomposer in decomposition facility 110, and make the decomposed data available for use by the printing hardware 114. System control 108 is also the site in which certain other functions, such as scheduling a plurality of individual jobs, or determining what available printing hardware is capable of carrying out the desired requirements of a particular job, are carried out. Further details about the operation of system control 108 will follow below.

Figure 2:
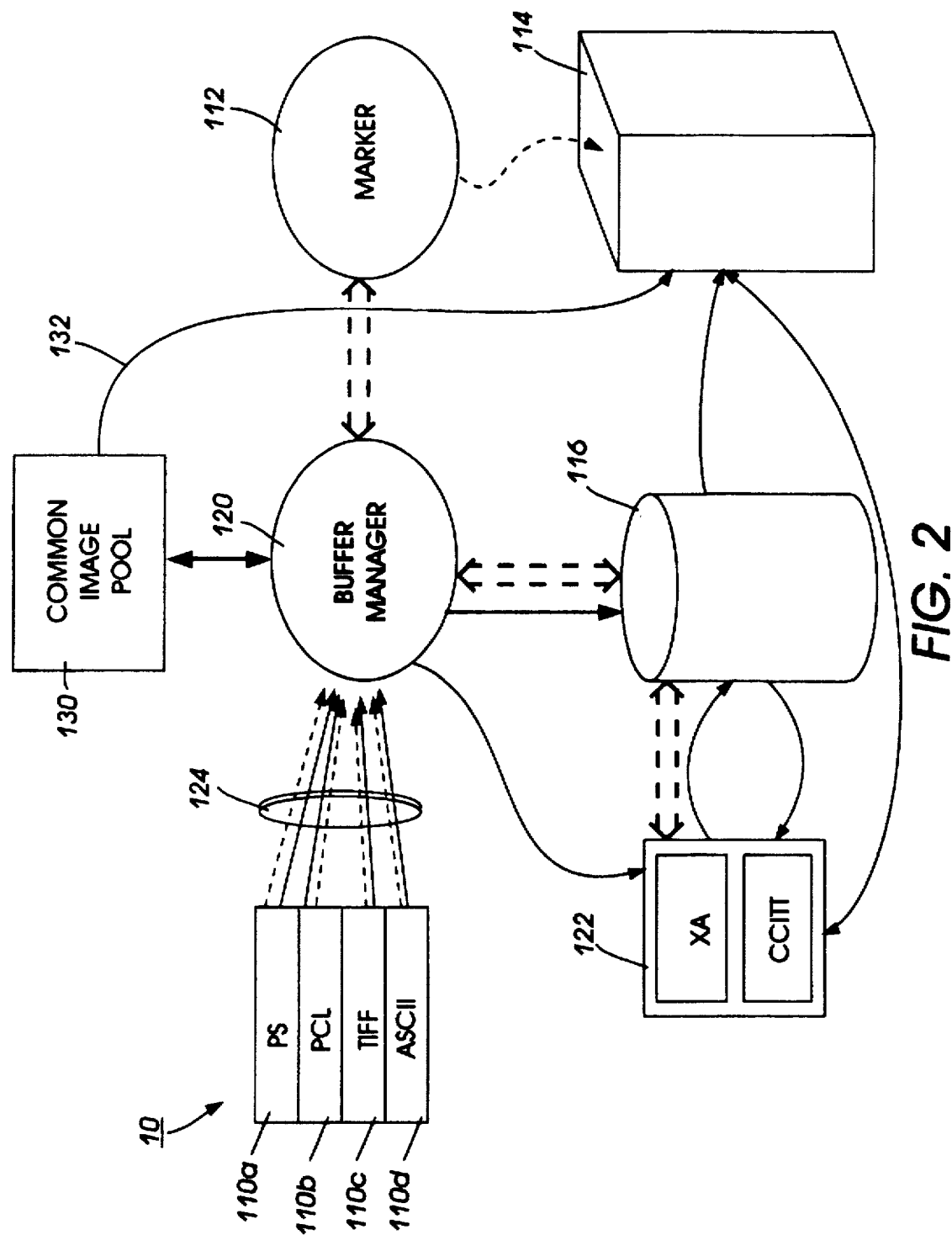
FIG. 2 is a systems diagram showing the basic elements of a preferred embodiment of a decomposing and marking system according to the present invention.

FIG. 2 shows some of the previously-mentioned elements of the printing system of the present invention, with the addition of a buffer manager indicated as 120 and a compression element indicated as 122. Under the convention of FIG. 2, streams of image data, regardless of the degree of compression thereof, are indicated by solid arrows, while data affecting the control of the PDL or image data is shown by broken arrows.

In the detailed view of FIG. 2, the decomposition facility 110 is here shown as four separate and independent decomposers 110a, 110b, 110c, and 110d. Each independent decomposer 110a–110d has the function of processing input data (from spool 106, as shown in FIG. 1) according to a specific PDL or other format. As shown in FIG. 2, decomposer 110a is a PostScript interpreter, 110b is a PCL interpreter, and 110c and 110d interpret TIFF and ASCII codes respectively. Different decomposers, specific to different formats to be interpreted, will be activated as needed by the data being removed from the spool 106. In order to determine which particular decomposer is required for a particular set of data, either different required decomposition facility can be specifically called into action by use of "guessing" algorithms associated with some controller of the decomposition facility 110. Such "guessers," such as detecting "%!" commands to identify PostScript files, are known in the art. It may also be desirable, in certain situations, to provide multiple decomposers of the same type, such as multiple PostScript interpreters, which may be used simultaneously in parallel, thereby increasing the total throughput speed of the system. It may also be desirable to provide separate decomposers of the same type, such as PostScript, but which output bitmaps at different resolutions, such as 300 spots per inch and 600 spots per inch.

After a file from spool 106 is decomposed or interpreted by one of the appropriate decomposers in decomposition facility 110, the output is digital data which can be used to operate, for example, a xerographic or ink-jet marking engine in printer hardware 114. These data streams are indicated as 124. In a network environment, and where individual jobs are of relatively large size and may require special handling such as for collating and stapling, the decomposed file often must be retained temporarily until marker 112 requests that the data be sent to the printer hardware 114. In the illustrated embodiment, this decomposed data is retained in a buffer in the form of discrete page images, each page image corresponding to an image to be printed on one page by printing hardware 114. (One skilled in the art will appreciate that a "page" in this context could refer to an image on one side of a duplex sheet, or one page image in a signature.) Buffer manager 120 is a software construction which accepts any of these data streams 124 and controls the storage of the binary data on either spool 116 or image pool 130. (As used in the claims herein, a "buffer" refers to any memory which temporarily retains decomposed PDL data from decomposition facility 110. Thus, in the illustrated embodiment, either spool 116 or common image pool 130 can be said to form at least part of a "buffer.")

Common image pool 130, which has special functions which will be described in detail below, acts as an initial buffer functionally immediately downstream of the decomposers in decomposition facility 110. A completely uncompressed bit map image, at a typical resolution, of a page to be printed is typically about 4 MB in size; thus, data emerges at various times from the different decomposers 110a–d in 4 MB batches. In typical prior-art decomposers, each decomposer is provided with its own dedicated 20 MB buffer at its output end, to retain the uncompressed data until requested by some other part of the system. The common image pool 130 in effect is a replacement for the individual buffers associated with each decomposer: instead of each individual decomposer 110a–d in decomposition facility 110 retaining data by itself, all data is sent to the common image pool 130, which typically has a capacity of 40 MB. An advantage of using a common image pool, as opposed to separate buffers for each decomposer in decomposition facility 110, is that different decomposers of different types output data at different rates, and a common image pool 130 allows realtively faster decomposition facilities to be unconstrained by limits on buffer space. In effect, a common image pool such as 130 allows the amount of memory apportioned to each decomposer 110a–d to be proportional to the rate at which an individual decomposer outputs data. Further, a common image pool such as 130 causes no memory to be "wasted" because the memory is dedicated to a particular decomposer that is not in use at a particular time.

In a preferred embodiment of the present invention, buffer manager 120 takes page images from common image pool 130 and sends them on to printing hardware 114 when the page images are requested by marker 112. In low-demand situations, marker 112 typically requests page images at a rate comparable to the rate the images enter image pool 130. In high-demand situations, however, as would be found in network printing systems, page images (i.e., decomposed files) may have to wait for a particular desired printing hardware 114 on the network to become available, and therefore are taken by buffer manager 120 from common image pool 130 for storage on spool 116.

The decomposed files stored on spool 116 are preferably in the form of compressed binary data, as opposed to the "bits" which are used to directly operate hardware, or the original PDL language. In one practical embodiment of the present invention, a PDL on spool 116 is stored either in CCITT format, or else in a proprietary "Xerox Adaptive" format. In order to perform this compression, there is provided a compression element 122, typically in the form of a hardware card which includes means for compressing or decompressing data as desired in either the CCITT or Xerox Adaptive format. Compression element 122 could be in the form of software instructions as well. Generally, just before the data is placed on spool 116, buffer manager 120 activates the compression element 122 to compress the data; similarly, as the decomposed and compressed file is removed from spool 116 to operate printer hardware 114, the data can be decompressed also by compression element 122, as can be seen by the solid arrows in FIG. 2. It will further be noted that some types of printer hardware 114 include a decompression element as a part thereof, so that the data stream to printer hardware 114 in some cases need not be completely decompressed.

As is known in the art of high-volume on-demand printing equipment, printing hardware 114 may respond to many sets of instructions as to exactly how the finished job is desired. For example, a typical high-volume printer may include a number of trays in which to place the finished prints, and may include any number of means of "finishing" the prints, such as stapling or binding. Further, a job may require a combination of different types of available print stock, such as colored papers, tab stock, and cardboard covers. All of these finishing requirements, which are present on the original job description data (such as on a separate job ticket or embedded in the file) submitted to print service 104, are ultimately carried out by software instructions from marker 112 to control the individual motors, paper diverters, etc., in the printer hardware 114. The instructions from marker 112 are illustrated by the broken line arrow to printer hardware 114. The software inputs to marker 112 include a quantity of job description information which system control 108 submits to marker 112 in FIG. 1, and ultimately from the job description submitted by client 100 (which, as mentioned above, can include instructions on a job ticket, and/or instructions embedded in the original file). Among these job description instructions received by marker 112 are the output destination of what trays in which the finished prints are to be deposited; the finishing requirement, such as stapling, binding, etc.; and the number of copies required. Other job description data could include whether or not the job is intended to be duplexed (printed on two sides of each page), and what type or combination of types of paper stock is desired. It is fairly typical that printing a booklet, for example, will require white regular-weight stock for the inner pages, and heavier colored stock for the cover. Many of these job description instructions ultimately submitted to marker 112 will be manifest in specific instructions to hardware within the printer hardware 114, such as to paper of a particular type from one stack or another as the job is being printed.

In addition to the job description instructions input into marker 112, the marker 112 interacts with buffer manager 120 to coordinate the operation of the printer hardware 114 (most specifically, in the sense of drawing the proper paper stock for printing a particular page, and directing the printed page to the correct finisher, such as a stapler) with the stream of PDL from spool 116. The marker 112 must interact with buffer manager 120 so that the right file is used to print an image on the right sheet at a particular time. A key function of buffer manager 120 is, as its name implies, to keep track of what file is located where within spool 116, so that the correct data can be placed into and retrieved from spool 116 as necessary. This coordination of control instructions from marker 112 and retrieve file from spool 116 via buffer manager 120 is carried out as follows.

When decomposed data from a decomposition facility 110 is output to buffer manager 120, buffer manager 120 places the file at an available location in spool 116, and records the location of the particular page data within spool 116. The address of each particular page data is retained by buffer manager 120, and preferably need not be "known" by marker 112. Significantly, the retrieval of data from a particular location in spool 116 by buffer manager 120 is preferably invisible to marker 112; as will be described in detail below, it is the responsibility of the buffer manager 120 to retrieve the file from spool 116 for a particular image when required by marker 112.

A practical advantage of the present system is that the system enables simultaneous decomposition of files of different PDLs or formats, and enables these different-format files to be combined in a single job. That is, the different decomposition facilities 110a–d can be made to operate simultaneously, and further in a manner in which one particular decomposition facility need not wait for another to be completed before submitting its decomposed data to spool 116. To illustrate how this capability can be used advantageously, the following example may be considered.

Client 100 submits to print service 104 a print job having four portions, or "tasks," which are intended to be printed as a single document and stapled. The four tasks of the job are of different formats, as follows:

(1) PostScript file 1
(2) ASCII file 1
(3) PCL file 1
(4) PostScript file 2

Because the finished job is desired to be stapled, marker 112 must submit instructions to printing hardware 114 that the pages must be printed in reverse order N to 1, so that when the sheets are stacked face-up, they may be stapled in the correct order. Thus, in this instance, if the different portions of the job are decomposed in 1 to N order, the marker 112 must wait until all of the images of the job up to page N are decomposed and available in spool 116 before operation of the printer hardware 114 can begin.

The instructions from client 100 to cause printing hardware 114 to output pages having certain images and finished in a certain manner originates on the job ticket submitted by the client to print service 104. Print service 104 converts the information on the job ticket to what can be more generally described as a "job description" which is received by system control 108. In the illustrated embodiment of the present invention, system control 108 initially sets up the relationship among the decomposition facility 110, buffer manager 120 and marker 112, so that a multi-task job, such as in the present example, can be carried out. System control 108 receives from the job description the instructions from the client on whether a particular set of images to be decomposed is to be printed, saved on disk for later retrieval, or printed and saved. This is generally referred to as the "disposition" of the job. Once the disposition of a job is received by system control 108, system control 108 identifies specific tasks that need to be performed by individual elements in the system, in order to ultimately yield the desired output from printing hardware 114. In the present example, there are four distinct decomposer tasks, that is, tasks that must be performed by one or another decomposer, and also one marker task for marker 112.

It is a key function of system control 108 to set up a system of "stream handles," which are software constructs used by buffer manager 120 to keep track of where the individual page images for different files within a job are retained within spool 116. Having received the job disposition, and having derived the list of decomposer tasks, the system control 108 requests buffer manager 120 to set aside four stream handles, by which individual sets of data from one or another decomposer 110a–110d can be identified for retrieval from either memory 130 or spool 116. System control 108 requests buffer manager 120 to create one stream handle for every connection that will be effectively required between decomposition facility 110 and marker 112. So, for a job in which there is only one decomposer task and one marker task (that is, where there is only one PDL file which is decomposed by decomposition facility 110 and sent to marker 112), only one stream handle need be created by system control 108. However, in the present example, where there are four separate decomposer tasks (that is, the four individual files to be combined in one job) and only one task sent to marker 112 (because it can accumulates all of the separate files into a single job), four stream handles are created by system control 108. Also, these stream handles are used in a marker task sent from system control 108 to marker 112, so that marker 112 will be able to identify what data marker 112 should request from buffer manager 120, and in what order. The number of stream handles is dependent on the number of separate tasks to be performed by the decomposition facility 110, rather than on the size of the job or the number of pages therein.

Each stream handle received by marker 112 can be used as a "phone number" by which the marker 112 can identify the data for retrieval by buffer manager 120 so that it may be printed on a particular sheet available in printing hardware 114. Buffer manager 120 receives the stream handle and, in a manner invisible to marker 112, identifies the specific locations in spool 116 where the desired page images relating to the stream handle are located. Similarly, the decomposition facility 110 uses the stream handle (which has been provided by system control 108) to identify page images as they are output in streams 124. In this way, the buffer manager 120 can match up stream handles for requests from PDLs from marker 112 to PDLs it receives from decomposition facility 110, because any particular decomposer task is identified by the same stream handle.

Figure 3:
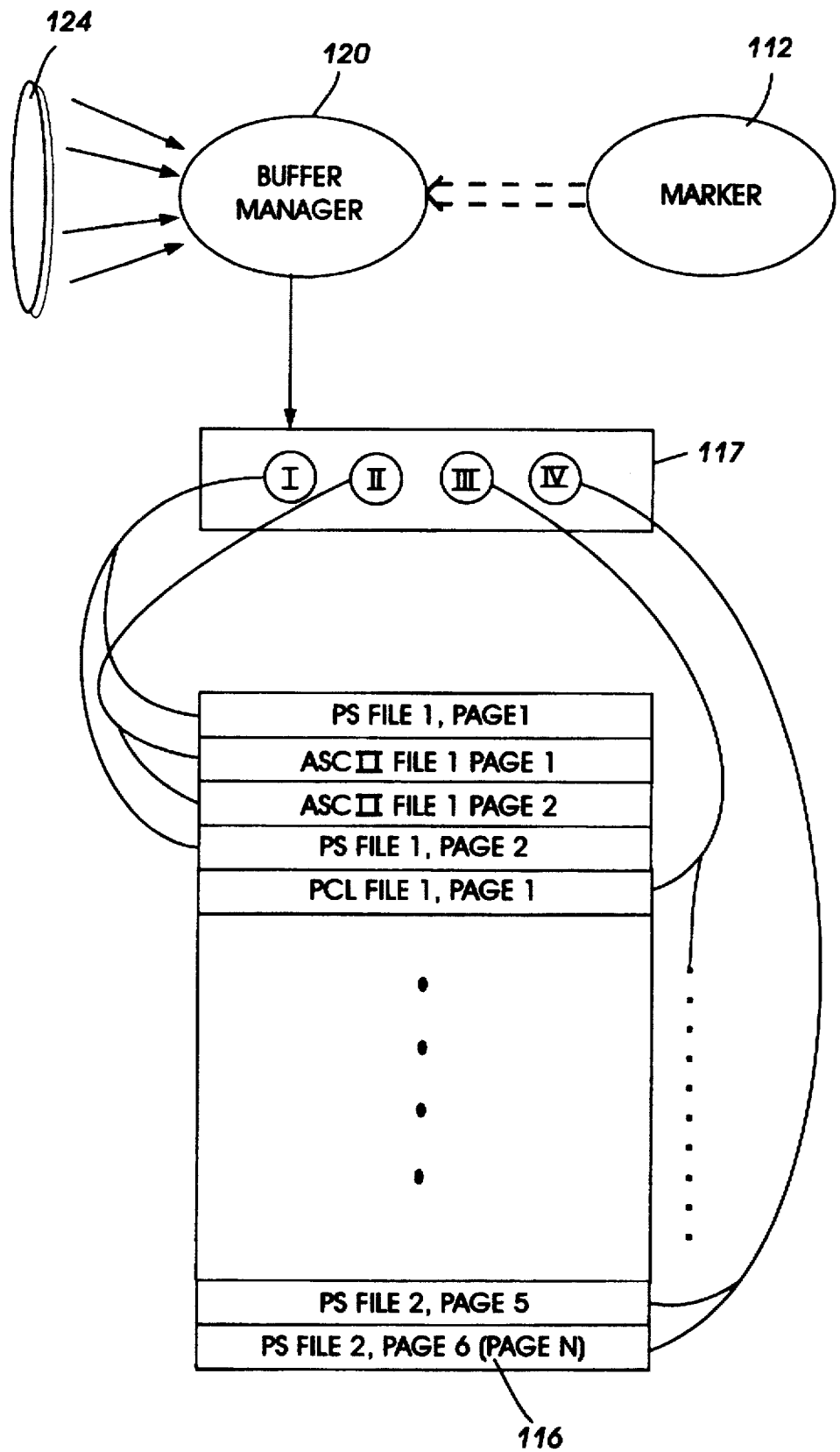
FIG. 3 is a diagram illustrating the concept of "stream handles" as used in one embodiment of the present invention.

As each page image is decomposed by one or another decomposer in decomposition facility 110, buffer manager 120 sends that individual page image to spool 116. Significantly, because different decomposers 110a–d for different PDLs or formats decompose at different rates, or because different tasks may be assigned different priorities, and also depending on the relative complexity of specific page images, the buffer manager 120 receives over time a mixed set of images to be submitted to spool 116. FIG. 3 shows an example of how space in spool 116 is filled up by an interleaved mixture of jobs as different decomposition facilities operate at different rates: individual pages of the different files forming the single above-mentioned job are accumulated in spool 116 as they are simultaneously decomposed by decomposers 110a–d. If one views the different files shown in FIG. 3 as being loaded into spool 116 from the top down, it can be seen that individual page images are entered into spool 116 in the order in which they are finished being decomposed by their respective decomposer in decomposition facility 110. However, because different decomposers are operating simultaneously, individual pages will be output by the various decomposers at different times, and any particular decomposition facility will not wait until another decomposer is finished before sending on its decomposed image to buffer manager 120.

In the example shown, the first page which was decomposed by any decomposer was page 1 of the PostScript file 1. However, before page 2 of the PostScript file 1 was submitted to spool 116, two pages of ASCII file 1 were completed decomposing and therefore were entered onto spool 116 before page 2 of PostScript file 1. Then, before any other decomposer sent on a finished page image, page 1 of the PCL file 1 was submitted to spool 116. Because in the illustrated embodiment there is only one PostScript decomposer, no page of PostScript file 2 could be decomposed until PostScript file 1 was completed. Thus, at the end of the job data in spool 116 are the final pages, here given as pages 5 and 6, of PostScript file 2. As it happens, the last page of PostScript file 2 is also the last page N of the whole job. However, the important phenomenon to note is that the different pages from different decomposers are jumbled up within spool 116, although the page order of individual files, such as PostScript file 1, is maintained. The challenge for buffer manager 120, however, is to be able to identify data belonging the each individual file in the job when marker 112 requests retrieval of individual file data.

In order to keep track of the jumbled page images in spool 116 for easy retrieval, according to the present invention, the stream handles assigned by buffer manager 120 are used. Examples of these stream handles are given as I, II, III, and IV in FIG. 3. For PostScript file 1, in the present example, buffer manager 120 assigns a stream handle I to those individual addresses within spool 116 where the page images of PostScript file 1 are retained. Similarly, buffer manager 120 assigns stream handle II to those addresses within spool 116 where the individual page images for the ASCII file 1 are retained, and so with stream handles III and IV for the other files making the individual job.

When marker 112 requires the multi-task job to be printed, marker 112 submits a request to buffer manager 120 which, in response, acts to retrieve the page images of each decomposed file in spool 116 in the desired page image order. Once again, because in the particular example the print is to be stapled and therefore requires that the prints be made in reverse (N to 1) page order, the data for the page images must be submitted from spool 116 to printer hardware 114 in reverse order. Thus, buffer manager 120 invokes the stream handles I–IV in reverse order, and then for each stream handle such as IV, submits page image data to printer hardware 114 in reverse order (last page to first page) within each stream handle. When buffer manager 120 invokes stream handle IV, buffer manager 120 retrieves the data for stream handle IV based on the list of addresses it compiled when decomposed data corresponding to stream handle IV was originally entered into spool 116. The page images corresponding to stream handle IV are then read out of spool 116 in reverse page order starting in this example with PostScript file 2, page 6, then page 5, and then to page 1 of PostScript file 2, wherever that may be. Then, when those page images corresponding to stream handle IV are submitted to printer hardware 114 then stream handle III is requested starting on the last available page of PCL file 1, then down to page 1 of PCL file 1. The process of reverse-order unloading of each page image is repeated for stream handles II and then I. This invocation of the stream handles thus serves to "un-jumble" the interleaving of page images which was caused by the simultaneous action of multiple decomposers 110a–d. The list of addresses corresponding to each stream handle can be retained either within the buffer manager 120 or in a special control file, here indicated as 117, forming part of spool 116.

For simple cases in which decomposition facility 110 outputs data of a certain stream handle when the marker 112 requests the data, the buffer manager 120 can connect decomposition facility 110 and marker 112 directly to each other without bothering with spool 116. Sometimes, because of the different rates at which different tasks are decomposed by decomposition facility 110, marker 112 will request data of a stream handle before it has been decomposed by the suitable decomposition facility. In such a case, buffer manager 120 can put the marker 112 "on hold"0 by sending marker 112 a code which indicates that the data relating to the requested stream handle is not yet available. When the requested data is subsequently output by decomposition facility 110, the buffer manager has a routine to "call back" marker 112 and establish, under a preferred embodiment, a direct connection between the decomposition facility 110 and marker 112.

In a preferred embodiment of the present invention, fault detection and handling during print runs is handled at the level of system control 108. System control 108 constantly receives status reports from, for example, each of the decomposers 110a–110d being used in a particular job. If, during the decomposition process there is a fault or error in the function of one or another decomposer, the decomposer sends its fault message to system control 108. System control 108 includes algorithms for deciding whether to abort or otherwise modify the job as a whole, in order to minimize the system-wide effects of a failure of one particular element, such as wasted paper.

On the whole, the arrangement of elements shown in FIG. 2 optimizes the throughput of the entire system under both low-load and heavy-load conditions. For simple jobs, in which all of the tasks are of the same PDL or other format, and there is no queue of jobs to be printed, image data can pass directly from the suitable decomposition facility 110 directly through common image pool 130 and directly to printing hardware 114, without need for temporary retention in spool 116. However, in high-load situations, or in situations where multiple files are to be combines in a single job, the buffer manager can use spool 116 as a temporary holding area to retain the data until specific page images, identified by stream handle, are requested by marker 112. The spool 116 could also be useful in situations where multiple copies from a single set of data are to be printed by marker 112: In such a case, the file need be only decomposed once and the decomposed compressed data retained in spool 116 to be copied out as often as necessary by marker 112.

The individual uncompressed files in common image pool 130 are identified by stream handles, just as in the manner of the compressed page images in spool 116, and are handled in a similar way by buffer manager 120. However, it is the nature of the system that the uncompressed images do not stay in the common image pool 130 very long; only until the images are requested by marker 112 for direct submission to printer hardware 114, or the buffer manager 120 decides to compress the image in compression element 122 for storage in spool 116.

In certain practical situations such as proofing, it has been found that a "print and save" option is often desired. It is often desirable to retain a commonly-used image in a special memory where it can be retrieved quickly. According to another aspect of the present invention, there is provided a system by which images which are desired to be saved in a certain way can be retained for quick retrieval in a "print and save" task.

Print images destined for "print and save" status may be of any original PDL or format, such as TIFF or PCL. However, once they are output from decomposition facility 110, buffer manager 120 sends the raw bitmap through compression element 122, where the bitmaps are CCITT compressed. The CCITT compressed data is then sent to spool 116, or perhaps to a special separate "print and save" spool (not shown). However, under instructions from buffer manager 120, the "print and save" job is saved as a CCITT compressed image or set of images. However, according to the preferred embodiment of the present invention, this CCITT compressed data is itself placed in a TIFF "wrapper," which in turn is placed within a PostScript "wrapper." That is, the CCITT PDL is expressed as a special case of a TIFF file, which in turn is expressed as a special case of a PostScript file. Viewed from the outside, the "print and save" job is a PostScript file: when the PostScript job is opened, the TIFF file is revealed within the PostScript file and in turn the CCITT data, which represents the image to be printed, is part of the TIFF file.

When it is desired to print a particular "print and save" job again, buffer manager 120 causes the specially-formatted job to be sent to a "demand reprint" decomposer within decomposition facility 110. This "demand reprint" decomposer can be a separate decomposer (not shown) within decomposition facility 110. This demand reprint decomposer is basically a PostScript decomposer. However, the demand reprint decomposer is modified to expect that the incoming data will always be of a particular form: certain parameters which are expressed in a PostScript file, and read on a job-by-job basis in normal PostScript, are fixed in the demand reprint decomposer. In particular, the demand reprint decomposer assumes that all data entering into it is of exactly one image per page, and further pays no attention to any external orientation instructions. That is, the demand reprint decomposer prints exactly one image per page, "as is." Particularly in PostScript, being able to make these assumptions makes for significant savings in total processing time, thus enabling fast reprinting of "print and save" jobs.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

We claim:

1. An apparatus for processing files in a first image format and a second image format, each of the files in the first and the second image format comprising data corresponding to at least one page image, comprising:

a first decomposer and a second decomposer, operable simultaneously and each independently, the first decomposer accepting the image data in the first image format and the second decomposer accepting the image data in the second image format, each of the first decomposer and the second decomposer outputting data relating to a series of discrete page images, each page image corresponding to an individual page to be printed;

a buffer for retaining discrete page images output by the first decomposer and the second decomposer;

a buffer manager for directing each page image output by the first decomposer and the second decomposer to an identifiable location in the buffer, and recording the location of each page image in the buffer; and a marker for requesting a set of page images desired to be printed to be read from the buffer to printing hardware.

2. The apparatus of claim 1, further comprising means for assigning stream handles to sets of locations of page images in the buffer, each stream handle being a name of a list of locations of page images in the buffer where a set of page images are desired to be printed as a single task;

the marker submitting a stream handle to the buffer manager to identify the desired set of page images.

3. The apparatus of claim 2, further comprising callback means, associated with the buffer manager, for sending a wait message to the marker in response to the marker submitting a stream handle of data which is not in the buffer, and then sending a call message to the marker when the data identifed by the stream handle is available in the buffer.

4. The apparatus of claim 1, the marker being capable of requesting page images to be submitted to the printing hardware in a predetermined order of either 1 to N or N to 1.

5. The apparatus of claim 1, further comprising a compression element for compressing data relating to page images being entered into the buffer.

6. The apparatus of claim 1, wherein the first decomposer is adapted to decompose data in a first image format, and the second decomposer is adapted to decompose data in a second image format.

7. The apparatus of claim 1, wherein the first decomposer and the second decomposer are adapted to decompose data in a same image format.

8. The apparatus of claim 1, the buffer including a common image pool, the common image pool being a memory immediately downstream of the first decomposer and the second decomposer, and acting as a shared buffer for the first decomposer and the second decomposer.

9. The apparatus of claim 8, the buffer further including a spool, the spool being a memory functionally separate from the common image pool, the buffer manager being selectably operable to send page images in the common image pool to the spool.

* * * * *